(12) United States Patent
Elder

(10) Patent No.: US 7,435,905 B1
(45) Date of Patent: Oct. 14, 2008

(54) ELECTRICAL CONDUIT BODY

(76) Inventor: James E. Elder, 1215 Arapaho Trail, Geneva, FL (US) 32732

(*) Notice: Subject to any disclaimer, the term of this patent is extended or adjusted under 35 U.S.C. 154(b) by 0 days.

(21) Appl. No.: 11/867,548

(22) Filed: Oct. 4, 2007

Related U.S. Application Data

(60) Provisional application No. 60/907,195, filed on Mar. 26, 2007.

(51) Int. Cl.
 *H02G 15/113* (2006.01)
(52) U.S. Cl. ..................................................... 174/92
(58) Field of Classification Search .................. 174/92, 174/138 F
 See application file for complete search history.

(56) References Cited

U.S. PATENT DOCUMENTS 3,168,613 A * 2/1965 Palmer ........................ 174/50
5,835,981 A * 11/1998 Smith .......................... 174/82

* cited by examiner

*Primary Examiner*—Chau N Nguyen
(74) *Attorney, Agent, or Firm*—McKinney Law, PLLC

(57) ABSTRACT

The electrical conduit body has a base section and an end section that forms an oblong box when joined together, and a cover removably attached to the box. The base section and the end section each have a semicircular recess forming a first port through the back wall opposite the cover. The base section has a second port extending through its closed end opposite the end section. In use, conduit wires are pulled through the second port and bent at a 90° angle towards the semicircular recess of the base section. The base section includes a pair of tongues for aligning and inserting into the grooves of the end section. The first port encircles the conduit wires as the base section and end section are brought together. The cover is secured to the box enclosing the wires within and fixing the end section and base section together.

20 Claims, 2 Drawing Sheets

ELECTRICAL CONDUIT BODY

1. CROSS-REFERENCED TO RELATED APPLICATIONS

This application claims the benefit of U.S. Provisional Application No. 60/907,195 filed Mar. 26, 2007. The disclosure of the provisional application is incorporated herein by reference.

2. FIELD OF THE INVENTION

The present invention relates to fittings and boxes for electrical wiring and conduits, and particularly to an electrical conduit body for joining 90° runs of conduit and wiring.

3. DESCRIPTION OF THE PRIOR ART

In a typical commercial construction application, conduit is installed first within a raceway and the conduit houses and protects the wiring. A component known as a conduit body or junction box is used at the junction of two or more conduits to joint the conduits together. The conduit body has a removable cover to provide access to the interior. A conduit body that provides for a 90° juncture or bend in the conduit and wiring is known as an L-type conduit body. When the conduit and wiring is diverted through an opening opposite the cover, the conduit body is known as an LB conduit body or LB fitting. When the conduit and wiring is diverted 90° through the left side or the right side, the conduit body is known as an LL or LR type fitting.

Conduit bodies are often used as junction boxes or pull boxes. For example, when used as a pull box, the cover is removed from the conduit body and the wire is pulled through the conduit to the entrance opening of the conduit body and out of the top of the conduit body. The wire is coiled on the floor and reinserted out through the other opening in the conduit body and pulled. The gasket and cover are then reinstalled.

However, due to the often heavy gauge of the wiring, the wires often become tangled or are difficult to bend in order to fit into the conduit body. Since wiring without a proper junction box is in violation of safety codes for almost all types of construction, the labor intensive work of fitting the wires to the prior art conduit body and junction box is required.

Where an LB type conduit body is involved, the most labor intensive part of fitting the conduit body is the bending of wire/conduit through a sharp 90° turn within the confines of the typical LB box. Accordingly, there is a need in the art for a novel, non-obvious and improved LB conduit body that reduces the amount of such labor-intensive activity.

Notwithstanding the existence of prior art LB boxes, there is a need for an improved LB conduit body that promotes the easy installation of wiring. It is, therefore, to the effective resolution of the aforementioned problems and shortcomings of the prior art that the present invention is directed. However, in view of the prior art at the time the present invention was made, it was not obvious to those of ordinary skill in the pertinent art how the identified needs could be fulfilled.

SUMMARY OF THE INVENTION

The electrical conduit body of the present invention includes a base section and an end section that form an oblong box when joined together, and a cover removably attached to the box. The base section and the end section each have a semicircular recess along one edge, the two semicircular recesses forming a first port through the back wall of the box opposite the cover. The base section has a second port extending through its closed end that is opposite the end section. In use, conduit wires are pulled through the second port and bent at a 90° angle towards the semicircular recess of the base section. The base section includes a pair of tongues for aligning and inserting into the grooves of the end section. The first port encircles the conduit wires as the base section and end section are brought together. The cover is secured to the box enclosing the wires within and fixing the end section and base section together.

It is therefore an object of the present invention to provide for an improvement that overcomes the aforementioned inadequacies of the prior art and provides a significant contribution to the advancement of a LB conduit body and junction box.

Both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
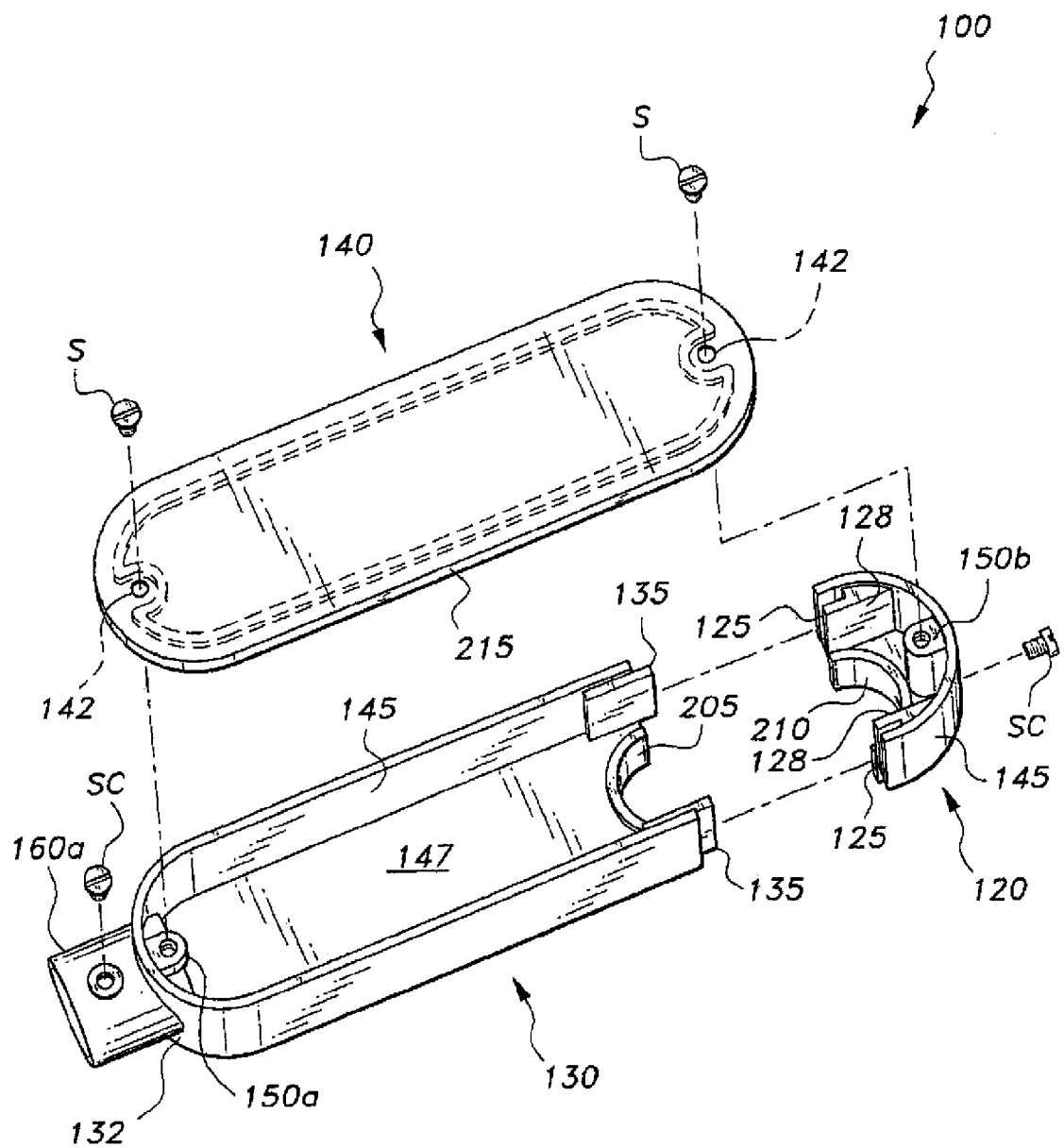
FIG. 1 is an exploded, perspective view of a three-piece LB conduit box according to an embodiment of the present invention as seen from the front.
Figure 2:
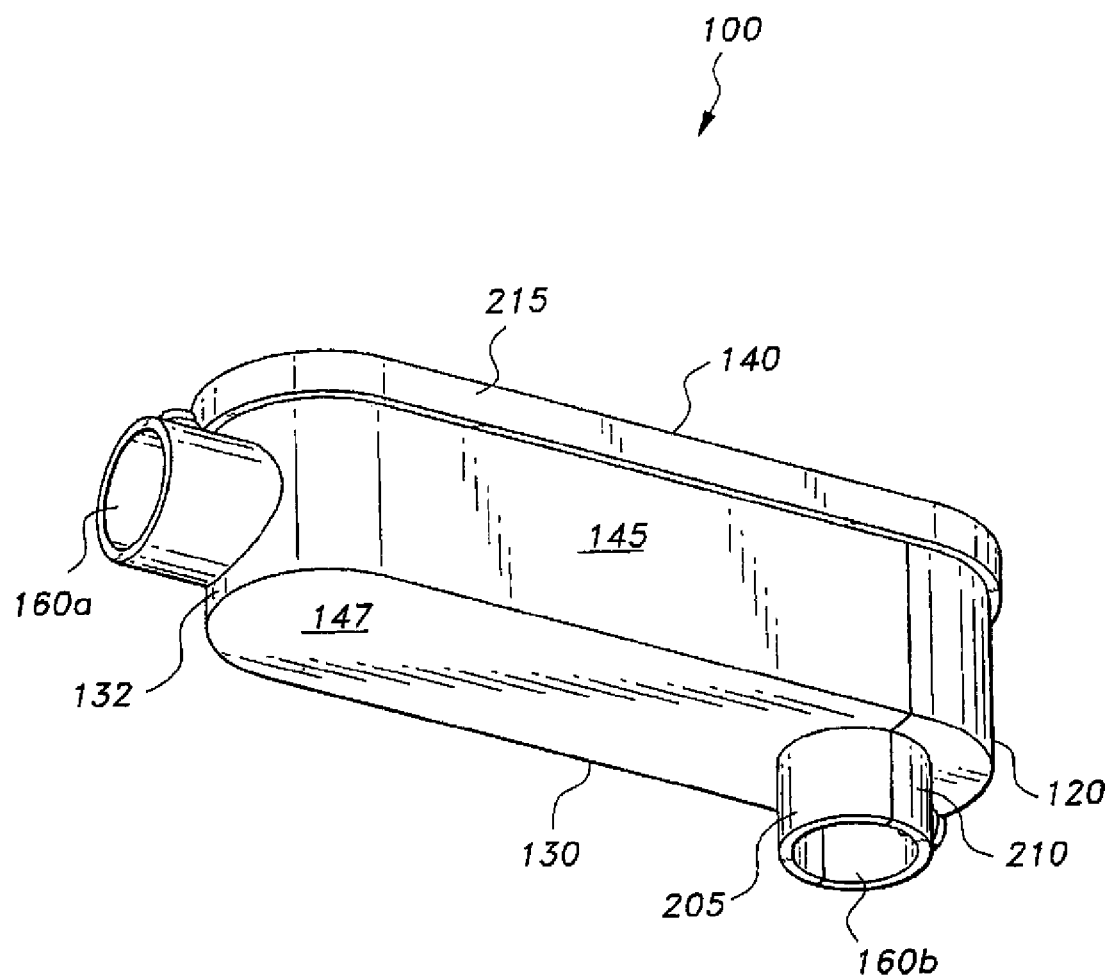
FIG. 2. is a perspective view of the three-piece LB conduit box according to an embodiment of the present invention as seen from the back.

As shown in FIGS. 1 and 2, three-piece LB conduit body 100 includes end section 120, base section 130, and cover 140. When joined together, end section 120 and base section 130 form an oblong, generally elliptical box having sidewall 145 extending about its periphery and having back wall 147. Sidewall 145 extends around one end of base section 130, forming closed end 132. Second port 160a extends through closed end 132 for securing conduit into conduit body 100.

The open end of base section 130 that is opposite closed end 132 includes flange 205 forming a semicircular recess in back wall 147. Pair of tongues 135 extends from sidewall 145 on opposite sides of the semicircular recess formed by flange 205. Boss 150a is formed adjacent to sidewall 145 at closed end 132 of base section 130.

End section 120 has sidewall 145 extending about its outer periphery and flange 210 forming a semicircular recess in its open end. End section 120 has bosses 128 attached to sidewall 145 on opposite sides of the semicircular recess, bosses 128 defining grooves 125. Fastener boss 150b is formed adjacent the closed end of end section 120. Base section 130 is aligned with end section 120 by inserting tongues 135 into grooves 125, so that base section 130 and end section 120 form an oblong, generally elliptical box. Flanges 205 and 210 define port 160b for routing conductors of a second section of conduit to or from conduit body 100. As shown in the drawings, port 160a and port 160b are oriented at 90° to each other. A gasket or sealant is interposed between the tongue and groove fitting to form a watertight seal between end section 120 and base section 130.

Cover 140 is oblong and generally elliptical, being generally dimensioned and configured for covering and closing the open front of the box formed by base section 130 and end section 120. Cover 140 includes apertures 142 formed in opposite ends aligned with bosses 150a and 150b so that screws S may be used to fasten cover 140 to the box, thereby securing base section 130 to end section 120. Setscrews SC are inserted through apertures in port 160a and port 160b for attaching conduit sections to conduit body 100. In the preferred embodiment, base section 130 and end section 120 include fastener passages defined therein for attaching conduit body 100 to a stud, circuit breaker box, or other support. Port 160a and port 160b are threaded for fastening lengths of conduit to conduit body 100, or for fastening conduit body 100 to a circuit breaker box or other terminus with comparable threading.

Cover 140 includes a flange 215 depending from its bottom surface that helps to align cover 140 with the oblong box. A gasket (not shown) or sealant is interposed between cover 140 and the box formed by base section 130 and end section 120 to form a tight seal to protect against, among other things, moisture.

Conduit wires (not shown) are pulled through port 160a and bent at a 90° angle towards semicircular recess 205 of base section 130. Base section 130 includes tongues 135 for aligning and inserting into grooves 125 of end section 120. First port 160b encircles the conduit wires as base section 130 and end section 120 are brought together. Cover 140 is secured to end section 120 and base section 130 enclosing the wires within and fixing end section 120 and base section 130 together.

Alternatively, conduit wires are pulled through semicircular recess 205 of base section 130 and bent at a 90° angle towards and through port 160a. End section 120 and base section 130 are then joined together and cover 140 secured thereto.

The particular embodiments disclosed above and in the drawings are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

It is also to be understood that the following claims are intended to cover all of the generic and specific features of the invention herein described, and all statements of the scope of the invention, which as a matter of language, might be said to fall therebetween.

Now that the invention has been described,
What is claimed is:

1. An electrical conduit body, comprising:
an end section having a first port flange defining a first semicircular recess, the end section further comprising a sidewall extending around a portion of its periphery and grooves defined adjacent to the sidewall on opposite sides of the first semicircular recess;
a base section having a closed end and a second port flange defining a second semicircular recess opposite the closed end, the base section having a sidewall extending about a portion of its periphery and tongues extending from the sidewall on opposite sides of the second semicircular recess, the end section and the base section forming an oblong box when the tongues are inserted into the receiving grooves, the oblong box having a back wall and an open front, the first and second port flanges joining to form a first port through the back wall for the passage of conduit conductors therethrough, the closed end of the base section having a second port extending therethrough for the passage of conduit and wire through the closed end of the base section and 90° to the first port; and
a cover removably attached to the base section and the end section, the cover closing the open front of the oblong box and fixing the base section and the end section together.

2. The base section of claim 1 further comprising a first fastener boss formed in the sidewall adjacent to the closed end of the base section to secure the cover to the base section.

3. The end section of claim 1 further comprising a second fastener boss formed in the sidewall of the end section to secure the cover to the end section.

4. The cover of claim 1 having an oblong shape and adaptable for covering and closing the open front of the box formed by the base section and the end section.

5. The cover of claim 4 further comprising a first aperture having an alignment with the first fastener boss of the base section so that a screw secures the cover to the base section.

6. The cover of claim 5 further comprising a second aperture having an alignment with the second fastener boss of the end section so that a screw secures the cover to the end section.

7. The base section of claim 1 further comprising a third aperture in the first port so that a setscrew is inserted through the third aperture to secure a conduit section to the base section.

8. The end section of claim 1 further comprising a fourth aperture in the second port so that a setscrew is inserted through the fourth aperture to secure a conduit section to the end section.

9. The base section of claim 1 further comprising a fastener passage defined therein for attaching the conduit body to a stud, circuit breaker box, or other support.

10. The first port of the base section of claim 1 further comprising internal threading for fastening the conduit to the conduit body.

11. The second port of the end section of claim 1 further comprising internal threading for fastening the conduit to the conduit body.

12. The cover of claim 1 further comprising a flange depending from its bottom surface that aligns the cover with the end section and base to form a watertight seal between the cover and the end section and the base section.

13. The conduit body of claim 1 further comprising a gasket interposed between the cover and the end section and base section to form a watertight seal against moisture.

14. An electrical conduit body, comprising:
an end section having a closed end and a first port flange defining a first semicircular recess opposite the closed end, the end section having a sidewall extending around a portion of its periphery and grooves defined adjacent the sidewall on opposite sides of the first semicircular recess;

a first fastener boss formed in the sidewall of the end section to secure a cover to the end section;

a base section having a closed end and a second port flange defining a second semicircular recess opposite the closed end, the base section having a sidewall extending about a portion of its periphery and tongues extending from the sidewall on opposite sides of the second semicircular recess, the end section and the base section forming an oblong box when the tongues are inserted into the grooves, the oblong box having a back wall and an open front, the first and second port flanges joining to form a first port through the back wall for the passage of conduit conductors therethrough, the closed end of the base section having a second port extending therethrough for the passage of conduit and wire through the closed end of the base section and 90° to the first port;

a second fastener boss formed in the sidewall adjacent to the closed end of the base section to secure the cover to the base section;

the cover removably attached to the base section and the end section, the cover closing the open front of the oblong box and joining the base section to the end section; the cover having an oblong shape and adaptable for covering and closing the open front of the box formed by the base section and the end section; and a flange depending from the bottom surface of the cover so that the cover aligns with the end section and base to form a watertight seal between the cover and the end section and the base section.

15. The cover of claim 14 further comprising a first aperture having an alignment with the second fastener boss of the base section so that a screw secures the cover to the base section.

16. The cover of claim 15 further comprising a second aperture having an alignment with the first fastener boss of the end section so that a screw secures the cover to the end section.

17. The base section of claim 14 further comprising a third aperture in the first port so that a setscrew is inserted through the third aperture to secure a conduit section to the base section.

18. The end section of claim 14 further comprising a fourth aperture in the second port so that a setscrew is inserted through the fourth aperture to secure a conduit section to the end section.

19. The conduit body of claim 14 further comprising a gasket interposed between the cover and the end section and base section to form a watertight seal against moisture.

20. An electrical conduit body, comprising:

an end section having a closed end and a first port flange defining a first semicircular recess, the end section having a sidewall extending around a portion of its periphery and grooves defined adjacent the sidewall on opposite sides of the first semicircular recess;

a base section having a closed end and a second port flange defining a second semicircular recess opposite the closed end, the base section having a sidewall extending about a portion of its periphery and tongues extending from the sidewall on opposite sides of the second semicircular recess, the end section and the base section forming an oblong box when the tongues are inserted into the grooves, the oblong box having a back wall and an open front, the first and second port flanges joining to form a first port through the back wall for the passage of conduit conductors therethrough, the closed end of the base section having a second port extending therethrough for the passage of conduit and wire through the closed end of the base section and 90° to the first port; and a cover removably attached to the base section and the end section, the cover closing the open front of the oblong box and joining the base section to the end section.

* * * * *